US005307186A

United States Patent [19]
Izumi et al.

[11] Patent Number: 5,307,186
[45] Date of Patent: Apr. 26, 1994

[54] LIQUID CRYSTAL LIGHT VALVE HAVING CAPABILITY OF PROVIDING HIGH-CONTRAST IMAGE

[75] Inventors: Yoshihiro Izumi, Kashihara; Tsuyoshi Okazaki; Hidehiko Yamashita, both of Tenri; Akitsugu Hatano, Nara, all of Japan

[73] Assignee: Sharp Kabushiki Kaisha, Osaka, Japan

[21] Appl. No.: 922,607

[22] Filed: Jul. 31, 1992

[30] Foreign Application Priority Data

Aug. 9, 1991 [JP] Japan .................................. 3-200558
Dec. 27, 1991 [JP] Japan .................................. 3-347205

[51] Int. Cl.$^5$ ..................... G02F 1/1335; G02F 1/135
[52] U.S. Cl. .......................................... 359/42; 359/55; 359/72; 359/82
[58] Field of Search ............... 359/42, 43, 70, 71, 359/72, 82, 34; 358/141, 142, 143, 144, 145, 132

[56] References Cited

U.S. PATENT DOCUMENTS

| 3,971,931 | 7/1976 | Jehle | 359/42 |
| 4,749,245 | 6/1988 | Kawatsuki et al. | 385/142 |
| 5,009,490 | 4/1991 | Kouno et al. | 359/72 |
| 5,054,872 | 10/1991 | Fan et al. | 385/143 |
| 5,148,297 | 9/1992 | Ishii et al. | 359/82 |

FOREIGN PATENT DOCUMENTS

2-134617 5/1990 Japan .

OTHER PUBLICATIONS

Hornberger, "liquid crystal display", IBM, vol. 12, No. 10 Mar. 1970, pp. 1697-1698.
Patent Abstracts of Japan, vol. 14, No. 366, Aug. 8, 1990 & JP-A2134617 (Seiko Epson) (Abstract).
Patent Abstracts of Japan, vol. 13, No. 448, Oct. 9, 1989 & JP-A-1173016 (Toray) (Abstract).
"A New Real-Time Non-Coherent to Coherent Light Image Converter, The Hybrid Field Effect Liquid Crystal Light Valve," *Optical Engineering*, May-Jun. 1975, vol. 14, No. 3, pp. 217-225.

*Primary Examiner*—William L. Sikes
*Assistant Examiner*—Huy Mai
*Attorney, Agent, or Firm*—Nixon & Vanderhye

[57] ABSTRACT

A liquid crystal light valve includes a first substrate having a transparent electrode formed thereon, a second substrate, a liquid crystal provided between the first and second substrates, a photoconductive layer formed between the liquid crystal layer and the first substrate, the photoconductive layer being adapted to change impedance thereof in response to an incident ray of light thereto, and a light waveguide for emitting light from the first substrate side to the photoconductive layer.

15 Claims, 9 Drawing Sheets

LIQUID CRYSTAL LIGHT VALVE HAVING CAPABILITY OF PROVIDING HIGH-CONTRAST IMAGE

BACKGROUND OF THE INVENTION

1. Field of the Invention

The present invention relates to a liquid crystal light valve which is used for a projection type display device, a spatial light modulating element and a coherent light operating element.

2. Description of the Related Art

The inventors of the present invention know of other addressing systems for forming an image on a liquid crystal valve according to a signal standing for an image (referred to as an image signal) which include an electric addressing system, a laser head addressing system or a light addressing system.

As to the electric addressing system, a liquid crystal light valve of a simple multiplexing driving system is arranged to have a plurality of scanning electrodes and signal electrodes formed in a matrix manner. This liquid crystal light valve is arranged to selectively apply an electric voltage on any of the pixels consisting of scanning electrodes X1, X2, ... Xn and signal electrodes Y1, Y2, ... Ym ranged in the X direction and the Y direction, respectively and transmit a scanning signal and a data signal through electric wires.

As to the light addressing system, a liquid crystal light valve is arranged so that a liquid crystal layer and a photoconductive layer are laid between both of the glass substrates and provide transparent electrodes for directly addressing the liquid crystal through the effect of irradiated light.

Typical examples of the light addressing type liquid crystal light valve have been disclosed in J. Grinberg, A. Jacobson, W. Bleha, L. Miller, L. Frasss, D. Boswell and G. Myer "A New Real-time Noncoherent To Coherent Write Image Converter" and "The Hybrid Field Effect Liquid Crystal Light Valve", Optical Engineering Volume 14, 217 (1975).

In these examples, the liquid crystal light valve of a light addressing type is arranged to have a pair of glass substrates, two transparent electrodes, a photoconductive layer, a dielectric mirror, two orientation films, a sealing member, a liquid crystal layer, and an A. C. power source. The A. C. power source serves to apply a voltage between the transparent electrodes. When an addressing (writing) ray of light is incident to one glass substrate, the impedance of the photoconductive layer is made smaller on the light-hit area (bright state) so that the voltage is applied from the A. C. power source to the liquid crystal layer. On the other hand, on the other area where no light impinges (dark state), the impedance of the photoconductive layer is kept constant so that no voltage may be applied to the liquid crystal layer.

The difference between the bright state and the dark state leads to forming an image data corresponding to the addressing light. The image data is allowed to be read by a reading ray of light.

This type of liquid crystal light valve may apply to a projection type display device, a coherent operating element, and so forth.

As another example, there has been proposed an addressing type liquid crystal light valve having a combination of the electric addressing system and the light addressing system. As disclosed in Japanese Lying Open No. 2-134617, a data signal in the electric addressing system is allowed to be transmitted by using a light signal.

The above-described electric addressing system liquid crystal light valve of a simple multiplex driving type is arranged to apply divided voltages on the pixels except display pixels. This known light valve hence has a disadvantage of lowering a display contrast. The time when a data signal used for controlling a display state is applied to the display pixels is a constant time defined by a duty ratio. For the remaining time, the data signal having no concern with the control of the display state is applied onto the display pixels. Hence, the liquid crystal disadvantageously responds to the data signal sent at a non-selecting time. To overcome these disadvantages, a method referred to as a voltage averaging method is generally used for the simple multiplex driving system having matrix electrodes.

However, the margin of an operating voltage in the voltage averaging method is made lower as the number n of scanning electrodes is increasing. In a case that the used liquid crystal material has constant electro-optical characteristics, the number n of scanning electrodes for holding a practical display quality is defined. Hence, the use of the voltage averaging method disadvantageously makes it possible to provide a higher resolution or a larger screen than that arranged for the held scanning electrodes.

Further, in the known electric addressing type liquid crystal valve, the resistance of wire and the capacitance cause a signal waveform to be delayed, resulting in being unable to realize a large device or a high-density device.

On the other hand, the known liquid crystal light valve of a light addressing system needs a CRT or an addressing light source such as a liquid crystal panel. This brings about a disadvantage that the overall device cannot be made reduced in size.

In the addressing system having a combination of the known electric addressing system and the known light radiation addressing system (see Japanese Lying Open No. 2-134617), the waveform of the data signal is converted into the change of light intensity and is written on the photoconductive layer. Hence, disadvantageously, it is necessary to provide a higher sensitive photoconductive layer which will be sensitive to a minute change of light intensity. And, the photoconductive layer has to have a quite uniform sensitivity distribution for uniformly displaying an image on the screen.

SUMMARY OF THE INVENTION

It is therefore an object of the present invention to provide a liquid crystal light valve which is capable of forming a high-contrast image and is reduced in size.

In carrying out the object, a liquid crystal light valve includes a first substrate having a transparent electrode formed thereon, a second substrate, a liquid crystal provided between the first and second substrates, a photoconductive layer formed between the liquid crystal layer and the first substrate, the photoconductive layer being adapted to change impedance thereof in response to an incident ray of light thereto, and a light waveguide for emitting light from the first substrate side to the photoconductive layer.

According to another aspect of the invention, the light waveguide is formed as stripes on the first substrate. The transparent electrode formed on the second substrate is patterned as stripes.

According to another aspect of the invention, the light waveguide is formed of a high-molecular waveguide.

According to another aspect of the invention, the light waveguide is formed of an electro-luminescent element.

According to another aspect of the invention, the first substrate contains two small substrates. The light waveguide contains a first light waveguide formed on one of the two small substrates and a second light waveguide formed on the other small substrate.

According to another aspect of the invention, one small substrate formed on the liquid crystal layer is formed of a fiber plate.

According to another aspect of the invention, at least one of the first and the second light waveguides is formed of an electro-luminescent element.

In operation, when a ray of light is applied to the photoconductive layer from the first substrate, the impedance of the photoconductive layer is changed so as to select the proper scanning lines. The impedance of the photoconductive layer on the selected portion to which is applied the light from the light waveguide is smaller than the impedance of the liquid crystal. This makes it possible to apply most of a data signal applied on the transparent electrode provided on the first substrate onto the liquid crystal layer. On the other hand, on the non-selecting part of the photoconductive where no light is applied from the light waveguide, the impedance of the photoconductive layer is larger than that of the liquid crystal layer. Hence, the data signal having no concern with controlling a display state is not allowed to be applied on the liquid crystal layer.

Since the scanning signal is transmitted with the light sent from the light waveguide, as mentioned above, this liquid crystal light valve does not apply the data signal onto the liquid crystal corresponding to the non-selecting part of the photoconductive layer constantly, unlike the known liquid light valve of the simple multiplex driving system for transmitting the scanning signal through electric wires. Hence, a bias ratio of a voltage applied from the selected part of the photoconductive layer to the liquid crystal layer to a voltage applied from the non-selecting part of the photoconductive layer to the liquid crystal layer becomes larger. The liquid crystal light valve is capable of forming an image at a higher contrast accordingly.

The overall device is reduced in size, because only one light source, that is, the liquid crystal light valve is needed.

Further, the scanning signal (pulse waveform) is converted into an on/off state of light before it is written in the photoconductive layer. Hence, what the photoconductive layer requires is only to indicate a larger impedance than a certain threshold value. The photoconductive layer is not required to have a high performance unlike the technique of converting the data signal into a variable light intensity when it is written on the photoconductive layer. This is advantageous in manufacturing the device.

According to the present invention, the scanning signal is transmitted through the light sent from an electro-luminescent element served as a light signal source for scanning. Hence, the light valve of this invention does not apply the data signal onto the liquid crystal corresponding to the non-selecting part of the photoconductive layer, unlike the known liquid crystal light valve of the simple matrix driven system arranged which matrix electrodes for transmitting the scanning signal through electric wires. It means that a bias ratio of a voltage applied from the selected part of the photoconductive layer to the liquid crystal layer to a voltage applied from the non-selecting part of the photoconductive layer to the liquid crystal layer is made larger. This results in the light valve of this invention forming an image at a higher contrast.

The light waveguides are formed on the two substrates contained in the first substrate. This results in eliminating a gap between the adjacent scanning lines and increasing the scanning lines in number, thereby improving the resolution and the numerical aperture.

Of the two substrates contained in the first substrate, the substrate formed on the side of the liquid crystal layer is formed of a fiber plate for the purpose of preventing a crosstalk caused by leakage of light.

Further objects and advantages of the present invention will be apparent from the following description of the preferred embodiments of the invention as illustrated in the accompanying drawings.

DESCRIPTION OF THE PREFERRED EMBODIMENTS

Figure 1:
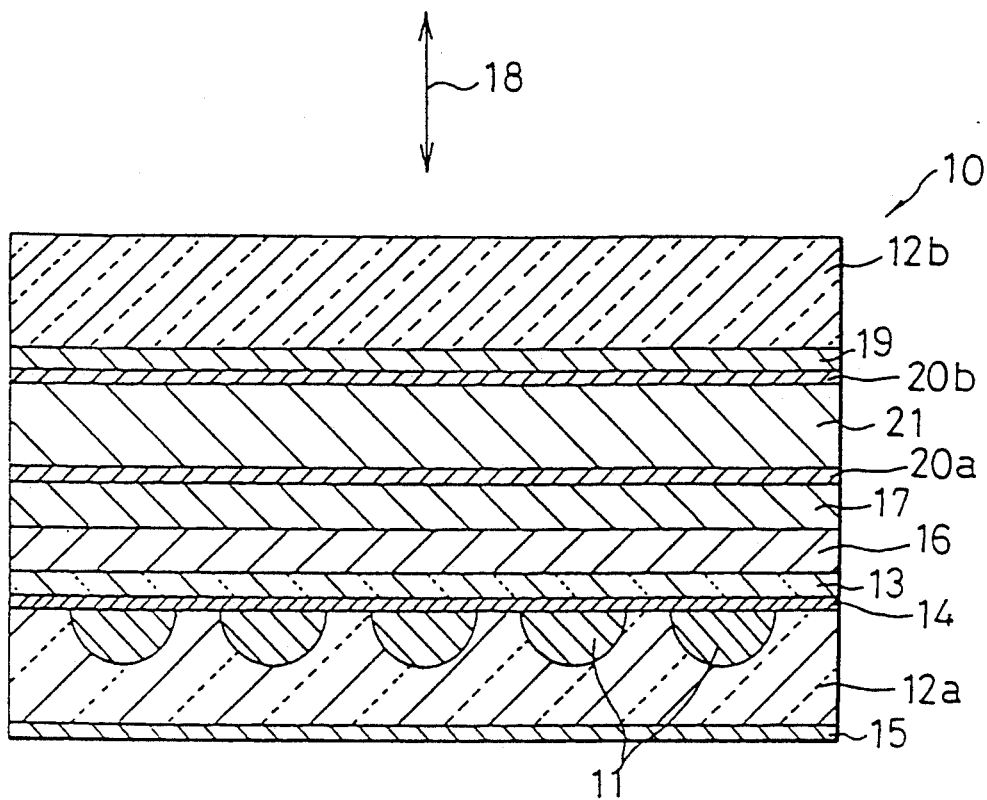
FIG. 1 is a sectional view schematically showing a liquid crystal light valve according to a first embodiment of the present invention.
Figure 4:
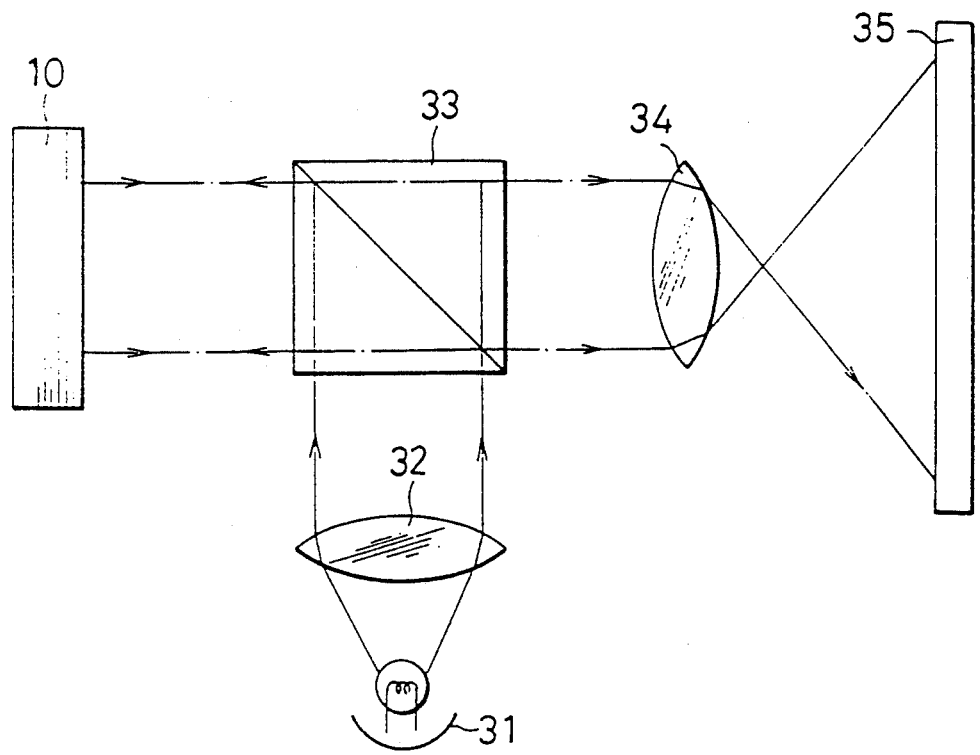
FIG. 4 is a schematic view showing an embodiment of a projective type image display device to which the liquid crystal light valve shown in FIG. 1 applies.

Herein, the description will be directed to a liquid crystal light valve according to a first embodiment of the invention as referring to FIGS. 1 and 4. FIG. 1 is a sectional view schematically showing the liquid crystal light valve.

As shown, 10 denotes a liquid crystal light valve, which is arranged to have a light waveguide 11, glass substrates 12a and 12b, a transparent electrode 13, a clad layer 14, a metal film 15, a photoconductive layer 16, a dielectric mirror 17, a data-transmitting electrode 19, orientation films 20a and 20b, and a liquid crystal layer 21.

The light waveguide 11 is formed as stripes (thin wires) on the glass substrate 12a by means of a heat- or electric-field-based ion-exchanging technique. A scanning light signal is transmitted along the light waveguide 11.

According to this embodiment, in order to guide even light of inferior directivity sent from a light-emitting diode, for example, as the light waveguide 11, a multimode light waveguide is formed by exchanging thallium (Tl) ion. In place, a silver (Ag) ion may be used.

The transparent electrode 13 is formed of tin-doped indium oxide (ITO: Indium Tin Oxide). The transparent electrode 13 is formed on the light waveguides 11 and the glass substrate 12a through the clad layer 14 located therebetween by means of a sputtering technique. The transparent electrode 13 may be patterned as stripes in a manner to be overlapped with the light waveguide 11.

The clad layer 14 is evaporated between the transparent electrode 13 and both of the glass substrate 12a and the light waveguide 11 by means of a sputtering technique. This is formed because the transparent electrode 13 has a larger index of refraction than the light waveguide 11. The material of the clad layer 14 is silicon oxide ($SiO_2$) which is a low-refractive dielectric. The $SiO_2$ film is required to have a thickness so as to allow a proper quantity of light to be leaked out of the light waveguide 11 serving as a light source. The preferable thickness is in the range of 500 angstrom to 5000 angstrom. In this embodiment, the thickness of $SiO_2$ is 3000 angstrom.

On the back surface of the glass substrate 12a, that is, an opposite surface to the surface where the light waveguides 11 are formed, a metal film 15 is deposited for cutting off the light applied from any place except the light waveguides 11.

The material of the metal film 15 is aluminium (Al) or molybdenum (Mo), for example. Alternatively, a pigment-dispersed type light-shielding film, which is often used for a color filter of the liquid crystal panel, may be used in place of the metal film 15.

On the transparent electrode 13, the photoconductive layer 16 is formed to receive light from the light waveguide 11. The photoconductive layer 16 is formed of amorphous silicon hydride (a-Si:H) by means of a plasma CVD (Chemical Vapor Deposition) technique.

In place of the material a-Si:H, the photoconductive layer 16 may be formed to have a characteristic of varying its impedance according to the quantity of irradiated light. Another material of the layer 16 may be bismuth silicon oxide ($Bi_{12}SiO_{20}$), cadmium sulfide (CdS), amorphous silicon carbide hydride (a-SiC:H), amorphous silicon oxide hydride (a-SiO:H) and amorphous silicon nitride hydride (a-SiN:H).

As a technique of suppressing a dark current in the photoconductive layer 16, it is possible to form an inhibitive electrode structure by utilizing selective transparency of carriers. For example, if the photoconductive layer 16 is formed of a-Si, a thin phosphorus (P)-doped n-type layer and a thin boron (B)-doped p-type layer, both made of a-Si, are combined to have a pin type diode structure or a pinip type back-to-back diode structure. Alternatively, the inhibitive electrode structure may be formed by using a Schottky junction or a hetero junction with a material having a wide-gap characteristic. A quite thin film (50 angstrom to 300 angstrom) of $SiO_2$ or silicon nitride ($SiN_x$) film may be deposited on one surface or both surfaces of the photoconductive layer 16 if necessary.

On the photoconductive layer 16, there is formed the dielectric mirror 17 by means of an electron-beam evaporation technique. The dielectric mirror 17 is made of a multilayered film consisting of one layer of titanium oxide ($TiO_2$) and the other layer of silicon oxide ($SiO_2$) alternately laminated.

To prevent reading light 18 from being leaked out to the photoconductive layer 16 through the dielectric mirror 17, a light-shielding layer may be formed between the dielectric mirror 17 and the photoconductive layer 16. As the light-shielding layer, it is possible to use a carbon-dispersed organic film, cadmium telluride (CdTe) and aluminum oxide ($Al_2O_3$) on which Ag is electroless-plated.

On the glass substrate 12b opposite to the glass substrate 12a, there is deposited on an data-transmitting electrode 19, which is made of ITO evaporated on the substrate 12b and is patterned as stripes by the sputtering technique.

On the dielectric mirror 17 and the data-transmitting electrode 19, the orientation films 20a and 20b are respectively formed by spin-coating a polyimide film and sintering the coated film. The molecular orientation is performed on the orientation films 20a and 20b by means of a rubbing technique.

Then, the glass substrates 12a and 12b are pasted through a spacer(s) (not shown) so that the data-transmitting electrode 19 may be located vertically with respect to the light waveguide for scanning 11. Liquid crystal is injected into the space defined by the orientation films 20a and 20b and the spacer(s) in order to form the liquid crystal layer 21. The liquid crystal to be used should be selected so that its impedance is larger than that of a part of the photoconductive layer 16 selected as a scanning line but smaller than that of the other part of the photoconductive layer 16 not selected as the scanning line.

In the liquid crystal light valve arranged as above, the liquid crystal layer 21 has a far larger impedance than the part of the photoconductive layer 16 selected as the scanning line by irradiated light, so that most of the data signal applied between the electrodes may be applied into the liquid crystal layer 21. The liquid crystal layer 21 has a smaller impedance than the other part of the photoconductive layer 16 where no light impinges, so that no data signal may be applied onto the liquid crystal layer 21.

According to this embodiment, therefore, the scanning signal is transmitted with the light from the light waveguide. The data signal is not allowed to be constantly applied onto the non-selected part of the photoconductive layer, unlike the known liquid crystal light valve of a simple multiplex driving system having a matrix electrodes for transmitting the scanning signal through electric wires.

As a result, a bias ratio of an voltage applied from the selected part of the photoconductive layer to the liquid crystal layer to an voltage applied from the non-selected part of the photoconductive layer to the liquid crystal layer is made larger. Hence, the light valve of this embodiment enables forming a high-contrast image and contributes to implementing a large device or a high-density device because the wire resistance or capacitance does not cause any delay to take place in a signal waveform.

Further, the light valve of this embodiment operates to increase a margin of an operating voltage used in a voltage averaging method, which voltage is defined by the normal number of scanning lines. This results in allowing the light valve to offer a higher resolution or a larger screen.

In addition, a gradation may be represented by modifying the waveform of the data signal.

In the above-described embodiment, the light waveguide 11 is formed on the same level as one surface of the glass substrate 12a. Alternatively, the light waveguide may be formed completely inside of the glass substrate.

Figure 2:
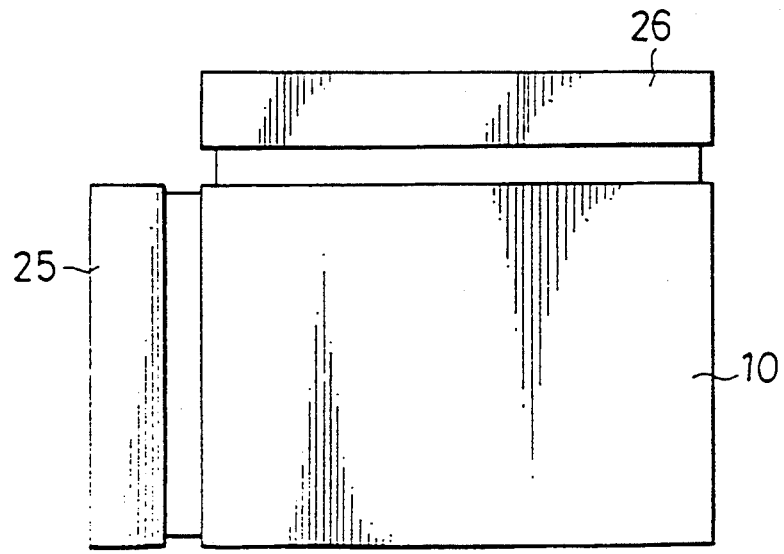
FIG. 2 is a schematic view showing a driving unit included in the liquid crystal light valve shown in FIG. 1.

FIG. 2 schematically showing a driving unit of the liquid crystal light valve 10 shown in FIG. 1. A signal or timing generating unit is not illustrated for simplifying the description.

As shown, the driving unit of the light valve 10 is constructed to have an LED (Light-Emitting Diode) array 25 for a scanning signal and a driving circuit 26 for driving the transparent electrodes 19. In place of the LED array 25, a semiconductor laser (LD) may be used.

The LED array 25 is connected to the liquid crystal light valve 10 so that a light pulse signal may be guided from the LED array 25 to the light valve 10.

Figure 3:
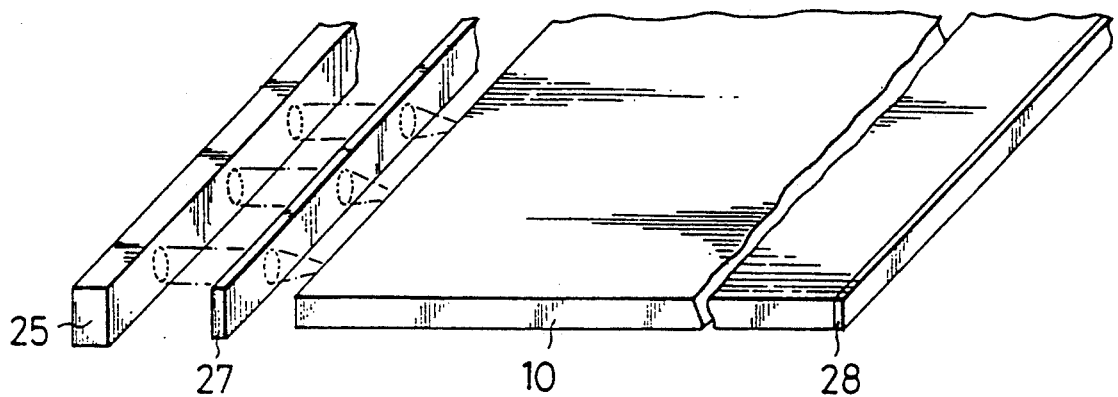
FIG. 3 is a perspective view showing a connection of an LED array shown in FIG. 2.

FIG. 3 is a perspective view showing a connection of the LED array 25 shown in FIG. 2 in detail.

As shown, the light emitted from the LED array 25 is guided to the light waveguide of the light valve 10 through an optical lens array 27. As an alternative connection, without using the optical lens array 27, the end of the light waveguide may be directly connected with the phosphor surface of the LED array 25.

28 denotes a reflective mirror, which serves to reflect the light leaked to the end of the light waveguide so that the light may be efficiently guided to the photoconductive layer. The reflective mirror is formed of Al or Ag and corresponds to the metal film 15 shown in FIG. 1.

FIG. 4 is a view schematically showing one embodiment of a projection type display device to which the liquid crystal light valve 10 shown in FIG. 1 applies.

As shown, the projection type display device is constructed to have the liquid crystal light valve 10, a lamp 31, a lens 32, a polarizing beam splitter 33, a lens 34, and a screen 35. The lamp 31 applies light through the lens 32 and the polarizing beam splitter 33 into the liquid crystal light valve 10 on which an image is formed. When the light transmits through the part of the liquid crystal layer where the molecular orientation is changed, the polarization of the light is changed through an electric-optical effect. Hence, the light reflected on the light valve 10 is allowed to transmit through the polarizing beam splitter 33. The reflected light is expanded through the lens 34 so that the image formed on the light valve 10 is allowed to be projected on the screen 25.

The liquid crystal light valve according to this embodiment, therefore, does not need an addressing light source for a CRT or a liquid crystal display unlike the known liquid crystal light valve of an optical addressing system which needs such a light source. Hence, the liquid crystal light valve of this embodiment makes great contribution to reducing the overall device in size.

The operation mode of the liquid crystal used in this embodiment is a hybrid field-effect mode of a nematic liquid crystal. As another operation mode, a twisted nematic mode, a supertwisted nematic mode or an electrically controlled birefringent mode may be used.

In addition, a ferroelectric liquid crystal, an antiferroelectric liquid crystal and a smectic liquid crystal providing an electro-clinic effect may be used. Further, a phase-change mode, a dynamic-scattering mode or a guest-host mode of the nematic liquid crystal, or a guest-host mode of a liquid crystal compound film or a smectic liquid crystal may result in removing the polarizing beam splitter 33.

In turn, the description will be directed to a liquid crystal light valve according to a second embodiment of the present invention.

Figure 5:
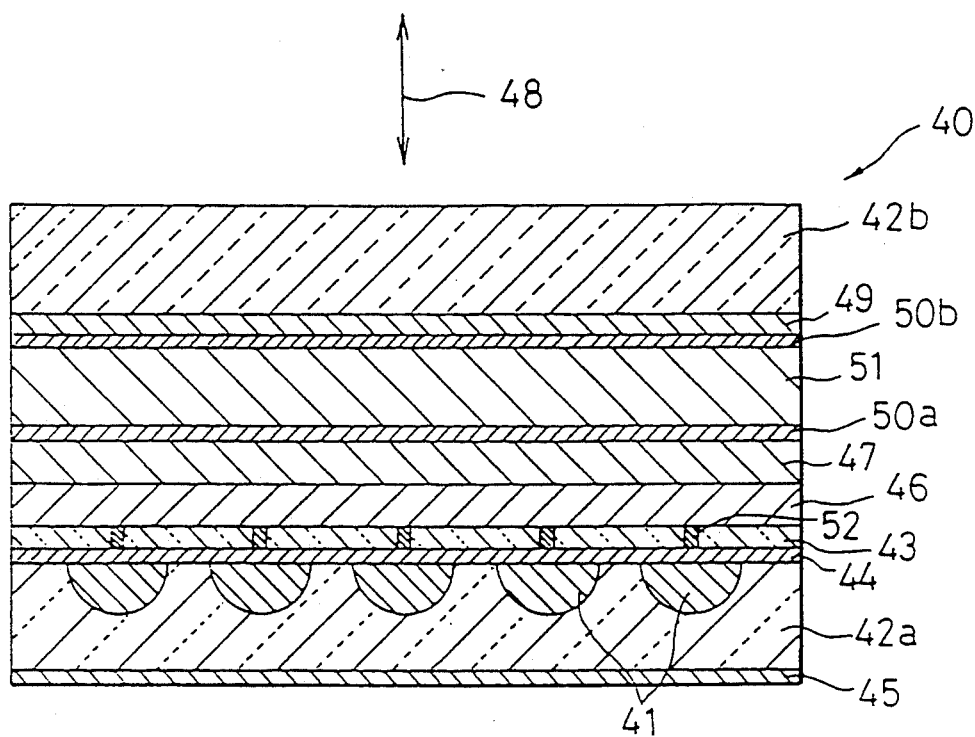
FIG. 5 is a sectional view schematically showing a liquid crystal light valve according to a second embodiment of the present invention.

FIG. 5 is a sectional view schematically showing the liquid crystal light valve of the second embodiment. As shown, the liquid crystal light valve 40 is formed to have a light waveguide 41, glass plates 42a and 42b, a transparent electrode 43, a clad layer 44, a metal film 45, a photoconductive layer 46, a dielectric mirror 47, a data-transmitting electrode 49, orientation films 50a and 50b, and a liquid crystal layer 51.

The light waveguide 41 is formed as stripes (thin lines) on the glass substrate 42a by means of an ion exchanging technique. A scanning light signal travels along the light waveguide 41. In this embodiment, a multi-mode waveguide formed by a Tl ion exchanging technique is used so that it may guide even light having inferior directivity such as the light emitted from an LED. Alternatively, an Ag ion may be used.

The transparent electrode 43 is formed of tin-doped indium oxide (ITO). The transparent electrode 43 is formed on the light waveguides 41 and the glass substrate 42a through the clad layer 44 located therebetween by means of the sputtering technique.

The patterns of ITO forming the transparent electrode 43 are located in parallel to and shifted by ½ pitch from the stripes of the light waveguide 41. The other portion of the transparent electrode 43 except the ITO is formed of an insulating material 52 such as $SiO_2$ for the purpose of preventing the short of the transparent electrodes 43. Hence, the light waveguide 41 and the insulating material 52 are overlapped with each other with the clad layer 44 being located therebetween.

The clad layer 44 is evaporated between the transparent electrode and the glass substrate 42a and the light waveguides 41 formed in the substrate 42a by means of the sputtering technique. This clad layer 44 is provided, because the transparent electrode 43 has a larger index of refraction than the light waveguide 41.

The clad layer 44 is formed of $SiO_2$ which is a low refractive dielectric. The $SiO_2$ film is required to have such a thickness as allowing proper light to be leaked out of the light waveguide 41 served as a light source. The preferable thickness is in the range of 500 angstrom to 5000 angstrom. In this embodiment, the thickness of SiO$_2$ is 3000 angstrom.

On the back surface of the glass substrate 42a, that is, an opposite surface to the surface where the light waveguides 41 are formed, a metal film 45 is deposited for cutting off the light applied from any place except the light waveguides 41.

The material of the metal film 45 may be Ag, Al or Mo. Alternatively, an pigment-dispersed type light-shielding film, which is often used for a color filter of the liquid crystal panel, may be used in place of the metal film 45.

On the transparent electrode 43, the photoconductive layer 46 is deposited to receive light from the light waveguide 41. The photoconductive layer 46 is formed of amorphous silicon hydride (a-Si:H) by means of the plasma CVD technique.

In place of the material a-Si:H, the photoconductive layer 46 may be formed to have a characteristic of varying its impedance according to the quantity of irradiated light. As another material, the layer 46 may be formed of Bi$_{12}$SiO$_{20}$, CdS, a-SiC:H, a-SiO:H and a-SiN:H.

As a technique of suppressing a dark current in the photoconductive layer 46, it is possible to form an inhibitive electrode structure by utilizing selective transparency of carriers. For example, if the photoconductive layer 46 is formed of a-Si:H, a thin phosphorus (P)-doped n-type layer and a thin boron (B)-doped p-type layer, both made of a-Si, are combined to have a pin type diode structure or a pinip type back-to-back diode structure. Alternatively, the inhibitive electrode structure may be formed by using a Schottky junction or a hetero junction with a material having a wide-gap characteristic. A quite thin film (50 angstrom to 300 angstrom) SiO$_2$ or SiN$_x$ film may be deposited on one surface or both surfaces of the photoconductive layer 46 if necessary.

On the photoconductive layer 46, there is formed the dielectric mirror 47 by means of the EB evaporation technique. The dielectric mirror 47 is made of a multi-layered films consisting of one layer TiO$_2$ and the other layer of SiO$_2$ alternately laminated.

To prevent reading light 48 from being leaked out to the photoconductive layer 46 through the dielectric mirror 47, a light-shielding layer may be formed between the dielectric mirror 47 and the photoconductive layer 46. As the light-shielding layer, it is possible to use a carbon-dispersed organic film, cadmium telluride (CdTe) and aluminium oxide (Al$_2$O$_3$) on which Ag is electroless-plated. On the glass substrate 42b opposite to the glass substrate 42a, there is deposited on an data-transmitting electrode 49, which is made of ITO evaporated on the substrate 42b and is patterned as stripes by the sputtering technique.

On the dielectric mirror 47 and the data-transmitting electrode 49, the orientation films 50a and 50b are respectively formed by spin-coating a polyimide film and sintering the coated film. The molecular orientation is performed on the orientation films 50a and 50b by means of the rubbing technique.

The glass substrates 42a and 42b are pasted through a spacer(s) (not shown) so that the data-transmitting electrode 49 is located vertically with the light waveguides for scanning 41. Liquid crystal is injected into the space defined by the orientation films 50a and 50b and the spacer(s) in order to form the liquid crystal layer 51. The liquid crystal to be used should be selected so that its impedance is larger than that of a part of the photoconductive layer 46 selected as a scanning line but smaller than that of another part of the photoconductive layer 46 not selected as the scanning line.

In the liquid crystal light valve arranged as above, the liquid crystal layer 51 has a far larger impedance than the part of the photoconductive layer 46 selected as the scanning line by irradiated light, so that the almost of the data signal applied between the electrodes may be applied into the liquid crystal layer 51. The liquid crystal layer 51 has a smaller impedance than the other part of the photoconductive layer 46 where no light impinges, so that no data signal may be applied onto the liquid crystal layer 51.

The liquid crystal light valve 40 is arranged so that one photoconductive layer 46 selected as a scanning line by irradiated light comes into contact with two scanning transparent electrodes 43 and the synchronous scanning is performed so as to apply a data signal onto only one scanning transparent electrode 43 in a manner that the scanning line is divided into two. The liquid crystal light valve according to this embodiment provides a high-contrast image and twice as large a resolution as the light valve according to this embodiment.

In the above-described embodiment, the light waveguides 41 are formed on the same level as one surface of the glass substrate 42a. In place, the light waveguide may be formed completely inside of the glass substrate.

The liquid crystal light valve according to the second embodiment has the same driving unit as that according to the first embodiment. The construction of a connection of an LED array included in the second embodiment is the same as that included in the first embodiment. The construction of a projection type display unit having the liquid crystal light valve 40 applied thereto and the operation mode of the liquid crystal are the same as those of the first embodiment shown in FIG. 4.

In turn, the description will be directed to a liquid crystal light valve according to a third embodiment of the present invention.

As described above, the liquid crystal light valve of the first embodiment has the driving unit containing the LED array 25 served as a scanning light signal source shown in FIG. 2. In this arrangement, however, it is necessary to quite accurately position the end of the light waveguide to the LED array. In order to make this troublesome work easier, the liquid crystal light valve according to the third embodiment is formed so that the LED unit having an LED array may be located on the same substrate as and adjacent to the light waveguide.

Figure 6:
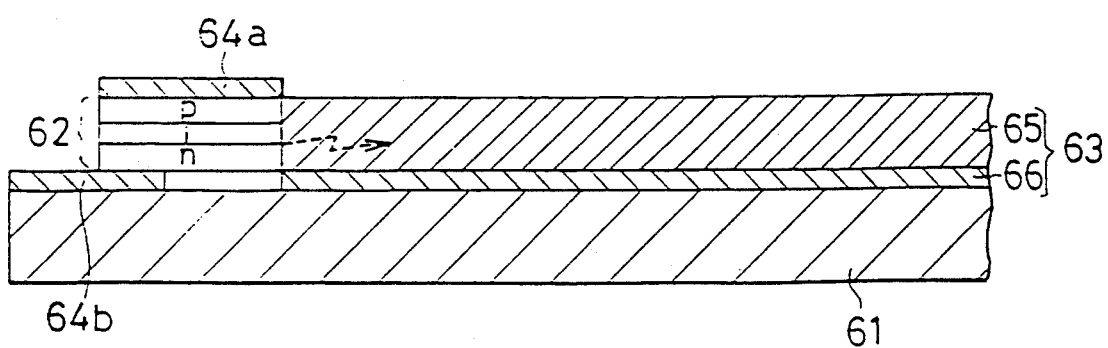
FIG. 6 is a sectional view showing a substrate where a light waveguide and an LED unit included in a liquid crystal light valve according to a third embodiment of the present invention.

FIG. 6 is a sectional view showing a substrate on which the light waveguide and the LED unit are formed in the liquid crystal light valve of this embodiment.

As shown, the LED unit 62 and the light waveguide 63 are formed on the substrate 61 made of silicon monocrystalline so as to locate the components 62 and 63 adjacent to each other. The LED unit 62 is formed of a-Si$_x$C$_{1-x}$:H and has a pin structure. This material makes it possible to form the LED unit 62 at a relatively low temperature and to provide the resulting LED unit with high luminance. In addition, if a buffer layer made of GaP may be provided and the used substrate contains no silicon, an LED made of a Al$_x$GA$_{1-x}$As system material is allowed to be used.

In this case, the LED contained in the LED unit 62 provides a phosphor wavelength range to be varied by adjusting a composition ratio X of the Al$_x$GA$_{1-x}$As system. Hence, the LED enables to change its luminous wavelength according to a sensitivity of the photoconductive layer, which is advantageous in improving its performance.

A light waveguide 63 is formed to have a core layer 65 made of $SiO_2$-$GeO_2$ and a clad layer 66 made of $SiO_2$. The light waveguide 63 made of an $SiO_2$ system material is formed by means of the CVD technique based on an oxidation of a $SiC_{14}$ gas and a $GeC_{14}$ gas. As another means, a flame deposition technique may be used. With this technique, in place of the $GeC_{14}$ gas, an $SiO_2$-$TiO_2$ formed by a $TiC_{14}$ gas may be used as the core layer.

On the top and the bottom are provided LED electrodes 64a and 64b, respectively. In a case of using the LED made of a-$Si_xC_{1-x}$, a transparent electrode or a metal electrode can be used as those electrodes 64a and 64b. In a case of using the LED made of $Al_xGa_{1-x}As$, a substrate 61 made of monocrystalline silicon can be used as an electrode.

As shown, the LED unit 62 and the light waveguide 63 are formed on the same substrate 61 in a manner to allow those components 62 and 63 to locate adjacent to each other. Hence, the light emitted from the LED unit 62 is guided into the light waveguide 63 located on the side of the LED unit 62.

That is, in place of the glass substrates 12a and 42a having the light waveguides 11 and 41 formed thereon according to the first and the second embodiments, the light valve according to the third embodiment provides the substrate on which the LED unit 62 and the light waveguide 63 are formed as mentioned above. The other construction of the light valve according to the third embodiment is the fundamentally same as that of the light valve according to the first or the second embodiment.

According to the third embodiment, like the first or the second embodiment, the liquid crystal light valve enables to offer a high contrast image and reduce the overall device in size.

The positioning of the LED unit 62 to the light waveguide 63 is implemented by a photolithography technique. The easy and accurate positioning is allowed.

In the third embodiment, the substrate 61 serves as a layer for cutting off a visible light. Hence, unlike the first and the second embodiments needing the metal films 15 and 45, no metal film is required.

In turn, the description will be directed to a liquid crystal light valve according to a fourth embodiment of the present invention.

Figure 7:
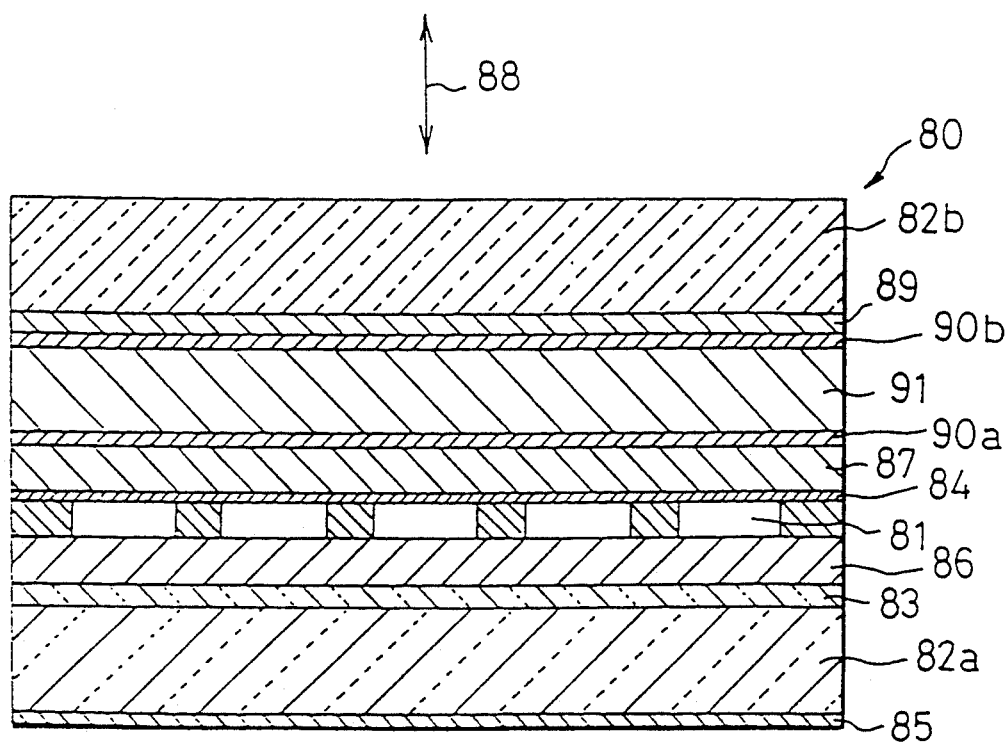
FIG. 7 is a sectional view schematically showing a liquid crystal light valve according to a fourth embodiment of the present invention.

FIG. 7 is a sectional view schematically showing the liquid crystal light valve of the fourth embodiment. As shown, the liquid crystal light valve 80 is arranged to have a light waveguide 81, a pair of glass substrates 82a and 82b, a transparent electrode 83, a clad layer 84, a metal film 85, a photoconductive layer 86, a dielectric mirror 87, a data-transmitting electrode 89, orientation films 90a and 90b, and a liquid crystal layer 91.

The light waveguide 81 is a high-molecular waveguide made of photo-polymerized polycarbonate Z. The striped patterns of the light waveguide 81 are allowed to be formed by means of a photo-lithography technique. As another material of the high-molecular waveguide, polyurethane, epoxy, photosensitive plastic or photoresist may be used.

Between the light waveguide 81 and the dielectric mirror 87, a clad layer 84 is provided for preventing light from being leaked from the light waveguide 81 to the dielectric mirror 87.

The clad layer 84 is formed by coating a resin having a smaller index of refraction than the light waveguide 81.

The glass substrates 82a and 82b, the transparent electrode 83, the metal film 85, the photoconductive layer 86, the dielectric mirror 87, the data-transmitting electrode 89, the orientation films 90a and 90b and the liquid crystal layer 91 have the same composition and material as those included in the first or the second embodiment.

Like the liquid crystal light valve according to the first or the second embodiment, the light valve according to the fourth embodiment enables to offer a high-contrast image and reduce the overall device in size.

In the foregoing first and the second embodiments of the invention, a highly heat-resistive and ion-exchange glass waveguide is used as the light waveguides 11 and 41, because it is necessary to consider a process temperature of the photoconductive layers 16 and 46 (about 300° C. in a case of using a-SiC:H as a material). The photoconductive layers 16 and 46 are deposited on the light waveguides 11 and 41. In the light valve of the fourth embodiment, on the other hand, the photoconductive layer 86 is located closer to the glass substrate 82a than the light waveguide 81. Hence, even the lower heat-resistive light waveguide 81 such as a high-molecular waveguide can be formed after forming the photoconductive layer 86. It means that a low heat-resistive high-molecular waveguide may be used as the light waveguide 81.

In the liquid crystal light valves according to the first to the fourth embodiments, a pair of polarizing plates are formed on both sides of the light valve in a crossnicol manner. If the liquid crystal light valve uses a ferroelectric liquid crystal having a storage function, the light valve may be used for a two-dimensional operating element.

In turn, the description will be directed to a liquid crystal light valve according to a fifth embodiment of the present invention.

In this embodiment, in place of a light waveguide served as a light signal source for scanning, an EL (electroluminescent) element is used.

Figure 8:
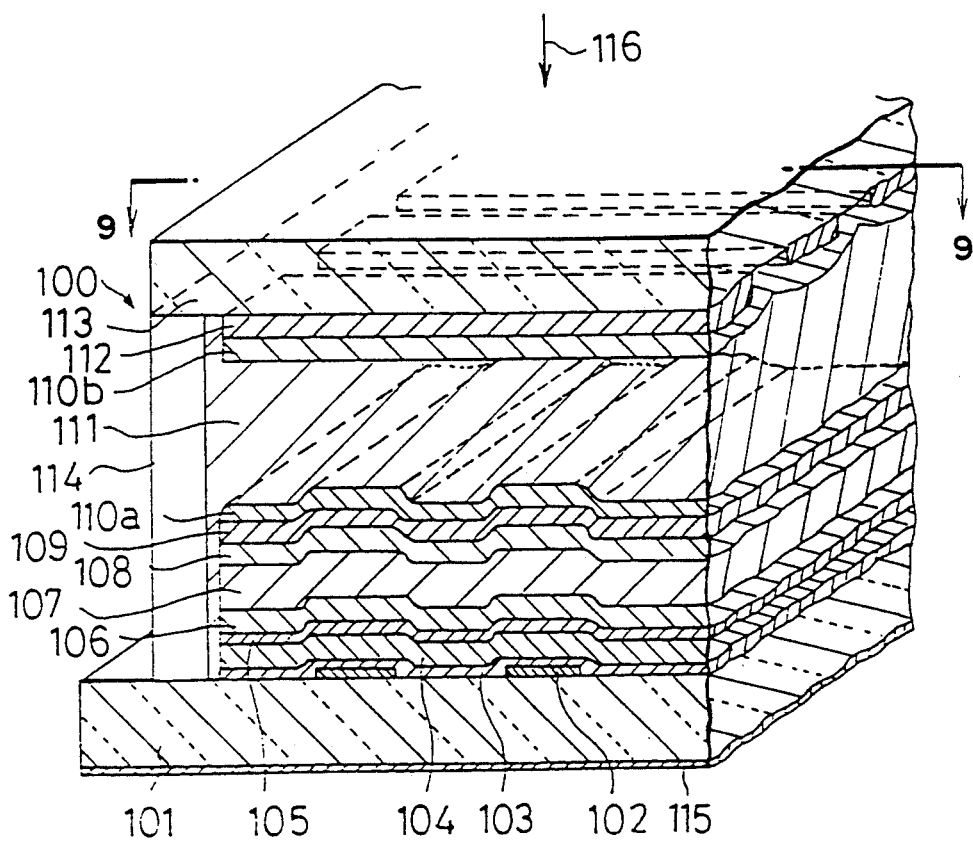
FIG. 8 is a perspective view schematically showing a liquid crystal light valve according to a fourth embodiment of the present invention.
Figure 9:
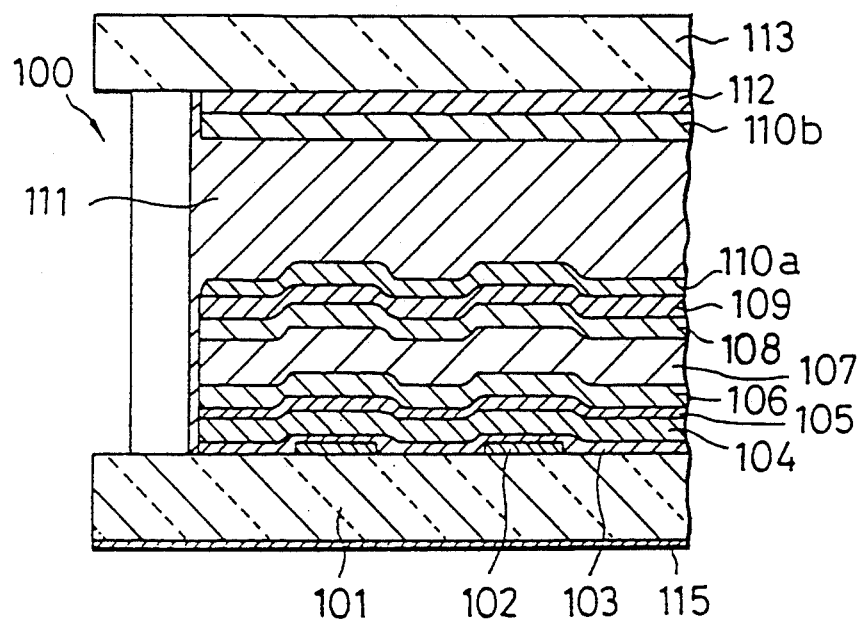
FIG. 9 is a sectional view cut on the line 9—9 of FIG. 8.

FIG. 8 is a perspective view schematically showing the liquid crystal light valve according to the fifth embodiment. FIG. 9 is a sectional view showing the light valve cut on the 9—9 line shown in FIG. 8.

FIG. 8 shows the structure where the phosphor layer is made of a thin film and the EL element is driven by an a. c. power source.

As shown in FIGS. 8 and 9, the liquid crystal light valve 100 is arranged to have a pair of glass substrates 101 and 113, a rear electrode 102, a lower insulating layer 103, a phosphor layer 104, an upper insulating layer 105, a transparent electrode 106, a photoconductive layer 107, a light-shielding layer 108, a dielectric mirror 109, orientation films 110a and 110b, a liquid crystal layer 111, a data-transmitting electrode 112, a sealing member 114, and a metal film 115.

Then, the description will be directed to the manufacturing method of the liquid crystal light valve 100.

The liquid crystal light valve 100 of this embodiment is formed to have a sandwiched structure wherein the phosphor layer is laid between the insulating layers for allowing the light emitted from the EL element to stably output light.

At first, the rear electrode 102 is formed on the glass substrate 101 by an EB evaporation technique. The material is aluminium. Then, the rear electrode 102 is subject to an etching process for patterning the electrode 102 as stripes. In place of aluminium, Ti (titanium) or Mo may be used.

In this embodiment, the rear electrode 102 is formed as stripes. The form of the rear electrode 102 is allowed to be changed so that the luminous elements may be disposed at various locations.

Then, between the rear electrode 102 and the transparent electrode 106, the insulating layers are provided for applying a stable high electric field onto the phosphor layer 104. In actual, those layers are the lower insulating layer 103 formed on the rear electrode 102 and the upper insulating layer 105 formed on the transparent electrode 106.

The lower insulating layer 103 is formed to have a laminated structure consisting of layers made of $Al_2O_3$ and $SiN_x$. The film of $Al_2O_3$ is formed by using an $Al_2O_3$ target in an atmosphere of an Ar (argon) gas. The film of $SiN_x$ is formed by using an Si target in an atmosphere of a mixed gas of Ar and $N_2$ (nitride). For forming these films, a RF (radio-frequency) sputtering technique is used.

Next, under the lower insulating layer 103, the phosphor layer 104 is laminated. The phosphor layer 104 is formed of a thin film type layer or a powder type layer in which a fluorescent material is dispersed in a dielectric.

Now, the thin film type phosphor layer will be described.

The thin film phosphor layer is formed of ZnS:Mn, which is formed by adding 0.5 wt % of Mn (manganese) of a main phosphor material in ZnS (zinc sulfide) of a host material. The substrate temperature is set in the range of 300° C. to 500° C. and the EB evaporation technique is used. The resulting luminous wavelength is 585 nm showing yellow.

By considering dependency of the photoconductive layer 107 formed thereafter on the light-sensitive wavelength of the phosphor layer, those materials are used for the luminous layer: for a red area, CaS:Eu made by adding Eu (europium) of a luminescent center material into CaS (calcium sulfide) of a host material, for a green area, ZnS:Tb, F made by adding Tb (terbium) and F (fluorine) of a charge-compensating material in ZnS, for a blue area, SrS:Ce, K made by adding Ce (cerium) and K (potassium) in SrS (strontium sulfide).

For forming the phosphor layer, it is possible to employ the CVD technique, the RF sputtering technique or an ALE (Atomic Layer Epitaxial) technique.

To remove moisture causing the phosphor layer to be degraded, it is necessary to perform the heat treatment of the phosphor layer in vacuum and in the range of 400° C. to 600° C.

Next, the description will be directed to a powder type phosphor layer.

The powder type phosphor layer is formed of ZnS:Cu, Cl made by adding Cu (copper) and Cl (chlorine) of main phosphor materials in ZnS of a mother material. The fluorescent material such as ZnS:Cu, Cl whose grain size is in the range of 5 μm to 20 μm is dispersed in the dielectric so as to form the phosphor layer in a thickness of 50 μm to 100 μm.

In a case of the powder type phosphor layer, the intensity of a field effect applied onto the phosphor layer is about $1 \times 10^4$ V/cm to $3 \times 10^4$ V/cm. Since insulation breakdown is unlikely to take place on the phosphor layer, the phosphor layer 104 made of a powder-type phosphor layer is allowed to be laid between the transparent electrode 106 and the rear electrode 102. That is, there are not necessarily formed the lower insulating layer 103 and the upper insulating layer 105.

The luminous color obtained by the phosphor layer is a blue green if ZnS:Cu, Cl is used as a main phosphor material, a green if ZnS:Cu, Al is used, or a yellow if ZnS:Cu, Mn, Cl is used. Like the thin-film type phosphor layer, it is possible to select a material according to the dependency of the photoconductive layer 107 on a light-sensitive wavelength.

Then, the upper insulating layer 105 is formed on the thin film type layer or the powder-type phosphor layer formed in the above process.

The upper insulating layer 105 is formed to have a laminating structure made of $SiO_X$ and $SiN_X$ films. The film of $SiO_X$ is formed in a mixed gas of Ar and $O_2$ (oxygen) and the film of $SiN_X$ is formed in a mixed gas of Ar and $N_2$. For forming these films, the RF sputtering technique is used.

As a material of the upper insulating layer 105, in place of $SiO_x$ and $SiN_x$, it is possible to use $BaTa_2O_6$ (barium tantalum oxide), $SrTiO_3$ (strontium titanium oxide) or $Ta_2O_5$ (tantalum oxide).

Next, by means of the RF sputtering technique, the transparent electrode 106 is formed on the substantially overall surface of the substrate composed of the glass substrate 101, the rear electrode 102, the upper insulating layer 103, the phosphor layer 104, and the upper insulating layer 105. The transparent electrode 106 is made of ITO.

The structure described above has an advantage that the light valve can be driven completely independency of the scanning light signal source made of the phosphor layer 104.

The phosphor layer 104 made of the EL element is allowed to be driven by a bipolar pulse. To use a single-polarity pulse, a current-limiting layer is required to be provided between the phosphor layer 104 and the rear electrode 102. The current-limiting layer is a thick film formed by dispersing $MnO_2$ (manganese dioxide) in a binder resin. The thickness of the layer is as wide as 1 μm to 10 μm.

Next, the film of a-Si:H is formed on the transparent electrode 107 by the plasma CVD technique. This film serves to receive light from the phosphor layer 104 served as a scanning light signal source.

As the photoconductive layer 107 whose impedance changes according to the irradiated light, it is possible to use $Bi_{12}SiO_{20}$, CdS, a-SiC:H, a-SiO:H, or a-SiN:H.

Next, the dielectric mirror 109 is formed on the photoconductive layer 107 through the light-shielding layer 108 being laid therebetween by means of the EB evaporation technique. The dielectric layer 109 is a multilayered film consisting of an alternate lamination of a film of $TiO_2$ and a film of $SiO_2$.

In order to prevent a reading ray of light 116 from being leaked out to the photoconductive layer 107 through the dielectric mirror 109, the light-shielding layer 108 is formed between the dielectric mirror 109 and the photoconductive layer 107.

The light-shielding layer 108 may be a carbon-dispersed type organic thin film, CdTe, or $Al_2O_3$ on which Ag is electroless-plated.

On the back surface of the glass substrate 101, that is, on a surface opposite to the surface where the EL element is formed, the metal film 115 is provided for cutting off the light irradiated from sources except the EL element. The metal film 115 is formed of Ag, Al, or Mo. In place of the metal film 115, it is possible to use a pigment-dispersed type light-shielding film used for a color filter of the liquid crystal panel.

On the glass substrate 113 opposed to the glass substrate 101, the data-transmitting electrode 112 is formed. To form the electrode 112, the material of ITO is evaporated by means of the sputtering technique and then is patterned as stripes.

A polyimide film is spin-coated on the dielectric mirror 109 and the data-transmitting electrode 112 and is sintered for the purpose of forming the orientation films 110a and 110b. The molecular orientation is performed on the surface of the orientation films 110a and 110b by means of the rubbing technique.

Then, the glass substrates 101 and 113 are pasted to each other with a spacer(s) (not shown) located therebetween in a manner that the data-transmitting electrode 112 may be crossed with the phosphor layer 104 served as a scanning light signal source at right angles. Then, liquid crystal is injected into the space between the glass substrates and is sealed by the sealing member 114, for the purpose of forming the liquid crystal layer 111.

The liquid crystal of the layer 111 has a far larger impedance than the part of the photoconductive layer 107 selected as a scanning line but a smaller impedance than the part of the photoconductive layer 107 not selected as a scanning line. Therefore, most of a data signal applied between the electrodes is applied to the liquid crystal layer 111. On the other hand, no data signal is applied onto the liquid crystal layer 111.

Figure 10:
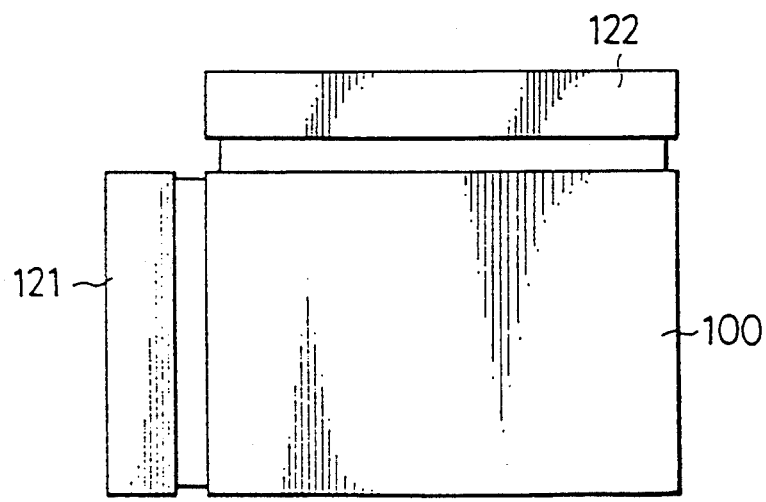
FIG. 10 is a schematic view showing a driving unit included in the liquid crystal light valve shown in FIGS. 8 and 9.

FIG. 10 is a view schematically showing a driving unit included in the liquid crystal light valve 100 according to the fifth embodiment. For simplifying the description, no signal-and timing-generating unit is not illustrated.

As shown, the driving unit of the liquid crystal light valve 100 provides a driver array 121 for driving an EL element for a scanning signal and a driving circuit 122 for driving the data-transmitting electrode 112 contained in the light valve 100.

The construction of the projection type display device using the liquid crystal light valve 100 and the operation mode of the liquid crystal layer are the same as those of the projection type display device shown in FIG. 4.

According to the fifth embodiment, therefore, the light valve enables a high-contrast image and reduce the overall device in size like the light valve according to the first embodiment.

Moreover, the luminous element array such as an LED array is not required to be connected to the light valve, so that no high-level technique such as positioning is required.

In turn, the description will be directed to a liquid crystal light valve according to a sixth embodiment of the invention.

Figure 11:
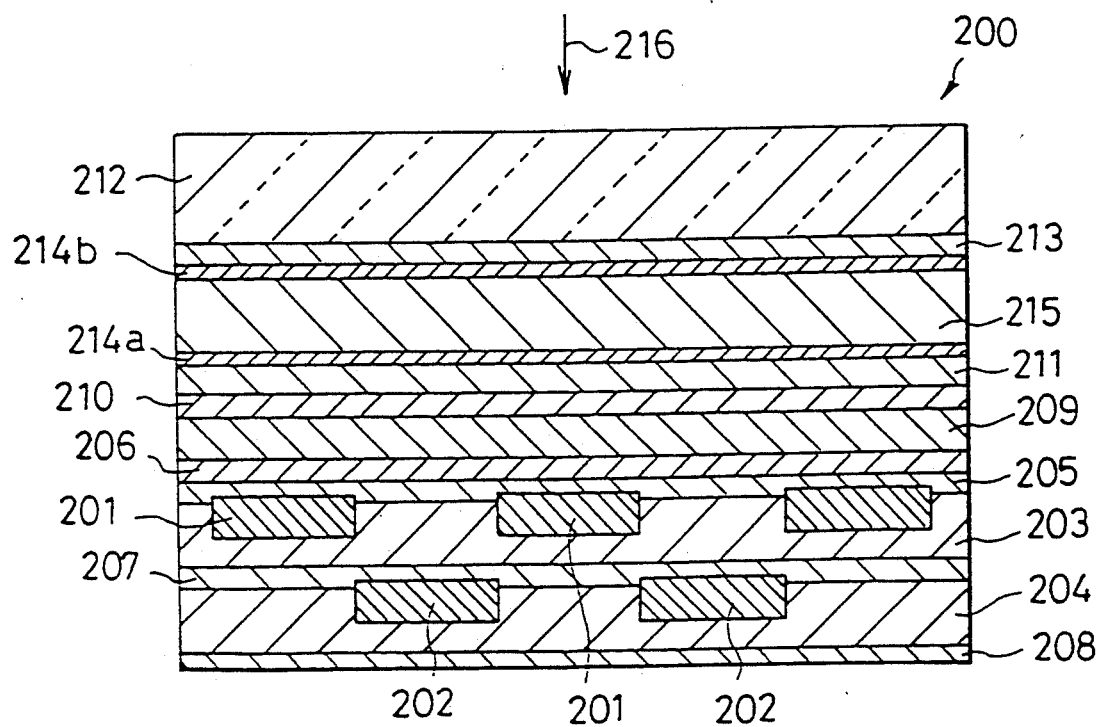
FIG. 11 is a sectional view schematically showing a liquid crystal light valve according to a sixth embodiment of the present invention.

FIG. 11 is a sectional view schematically showing the liquid crystal light valve according to the sixth embodiment.

As shown, the liquid crystal light valve 200 is arranged to have light waveguides 201 and 202, a first substrate 203, a second substrate 204, a clad layer 205, a transparent electrode 206, a coupling resin 207, a metal film 208, a photoconductive layer 209, a light-shielding layer 210, a dielectric mirror 211, a glass substrate 212, a data-transmitting electrode 213, orientation films 214a and 214b, and a liquid crystal layer 215.

As a scanning light signal, it is possible to use the leaked light transmitted through the light waveguides 201 and 202.

At first, the manufacturing method of the light waveguides 201 and 202 will be described.

For forming the light waveguide 201, grooves are formed on the first substrate 203 by means of a wet-etching technique. Concretely, resist is coated on both surfaces of the first substrate 203 and pre-sintered. Then, the resulting films are exposed, developed, and host-sintered. A mask is formed on one surface for forming the grooves. Next, an etching process is carried out by using buffered hydrofluoric acid and then the resist is stripped off the both sides. The resulting surface of a side has striped grooves.

In place of the wet-etching technique, it is possible to use a dry-etching technique such as a sputter etching technique using an Ar gas and an Ar-ion beam etching technique and a mechanical abrasion for forming the grooves.

The light waveguide 201 uses as its material a high molecular material, which is easily worked by a photolithograph technique or molded. Concretely, a highly heat-resistive polyimide is the most approximate, because it is necessary to heat the substrate temperature up to 300° C. when the photoconductive layer 209 is formed by the plasma CVD technique.

The polyimide solved with a solvent is coated on the grooves-formed surface of the first substrate 203 with a spinner. The resulting surface is then subject to heat treatment. Resist is coated on the heat-treated surface. The resist-coated surface is pre-sintered, exposed, developed and host-sintered for forming a mask in a manner to cover the grooves formed on the first substrate 203. Then, the coated polyimide is etched and the resist is stripped off the surface. The final heat treatment is carried out on the resulting surface for completing the light waveguide 201.

As a technique for etching the polyimide, a wet-etching method is carried out by using a hydrazine and hydrato system etchant.

In this embodiment, the used polyimide is non-sensitive. However, the use of sensitive polyimide makes it possible to reduce the steps of the manufacturing process of the light waveguide.

The polyimide has a large index of refraction than the first substrate 203 made of a fiber plate (described later), so that the clad layer is not needed on the side of the substrate.

On the light waveguide 201, on the other hand, the transparent electrode 206 made of ITO is formed. Since the transparent electrode 206 has a larger index of refraction than the light waveguide 201, it is necessary to provide the clad layer 205. The clad layer 205 is formed of SiO$_2$, that is, a dielectric material having a low index of refraction, by means of the sputtering technique.

As another method for forming the clad layer 205, the polyimide for forming the clad layer 205 has a smaller index of refraction than the polyimide used for forming the light waveguide 201. In these case, it is necessary to form the clad layer 205 so that the moderate quantity of light is allowed to be leaked out of the light waveguide 201. The proper thickness of the clad layer is in the range of 50 angstrom to 5000 angstrom. In this embodiment, the thickness of the clad layer 205 is about 3000 angstrom.

When forming the light waveguide 202 on the second substrate 204, it is necessary to match the indexes of refraction of the first substrate 203, the second substrate 204, the light waveguide 202 and the coupling resin 207 equal to one another. That is, in order that the light leaked out of the light waveguide 202 passes through the first substrate 203, the first substrate 203 must have a same or larger index of refraction than the light waveguide 202. Further, the second substrate 204 must have a smaller index of refraction than the light waveguide 202.

In order to meet those conditions, it is necessary to select a fiber plate having an index of refraction of about 1.53 as the first substrate 203, quartz having an index of refraction of about 1.457 as the second substrate 204 and polyimide having an index of refraction of about 1.53 as the light waveguide 202. The coupling resin 207 should be selected to have an index of refraction of about 1.48, because the coupling resin 207 comes into contact with the clad layer of the light waveguide 202. In this case, the polyimide having an index of refraction of about 1.61 can be used for the light waveguide 201.

The light waveguide 201 has the same width as the light waveguide 202. The pitch between the adjacent light waveguides 201 is twice as wide as the width of the light waveguide 201. Like the light waveguide 201, the pitch between the adjacent light waveguides 202 is twice as wide as the width of the light waveguide 202. The light waveguide 201 is located in parallel to the light waveguide 202 so that the light waveguides 201 are shifted from the corresponding light waveguides 202 by ½ pitch, respectively.

For forming the grooves on the second substrate 204 made of quartz, it is very effective to use a reactive ion etching (RIE) method. In place of $CF_4$, as a reaction gas, a mixed gas of $CF_4$ and $H_2$, a mixed gas of $CF_4$ and $C_2H_4$, $C_2F_5$, a mixed gas of $C_2F_6$ and $C_2H_4$, $C_3F_8$, a mixed gas of $C_3F_8$ and $C_2H_4$, $CHF_3$, and $C_4F_8$ may be used. In addition, it is also possible to employ the sputtering etching technique using an Ar gas, an argon ion beam etching technique, or a mechanical abrading technique.

The method for forming the light waveguide 202 is the same as that for the light waveguide 201 stated above.

On the back surface of the second substrate 204, that is, on the surface opposite to the surface on which the light waveguide 202 is formed, the metal film 208 is formed for cutting off the light applied from any place except the light waveguide.

The metal film 208 can be formed of Ag, Al or Mo. In place of the metal film 208, it is possible to use a pigment-dispersed type light-shielding film, which is mainly used for a color filter of the liquid crystal panel.

Next, the description will be directed to a method for forming the layers located above the clad layer 205.

On the clad layer 205, the transparent electrode 206 made of ITO is formed by the sputtering technique. On the transparent electrode 206, the material of a-Si:H is formed as the photoconductive layer 209 where light is received from the light waveguide 201 by means of the plasma CVD technique.

As the photoconductive layer 209 whose impedance changes according to the quantity of irradiated light, it is possible to use $Bi_{12}SiO_{20}$, CdS, a-SiC:H, a-SiO:H, or a-SiN:H.

Next, the light-shielding layer 210 is formed on the photoconductive layer 209. Then, the dielectric mirror 211 is formed by means of the EB evaporation technique. The dielectric mirror 211 is made of a multilayered film consisting of a layer of $TiO_2$ and a layer of $SiO_2$ alternately laminated.

In order to prevent reading light 214 from being leaked to the photoconductive layer 209 through the dielectric mirror 211, it is necessary to provide the light-shielding layer 210 between the dielectric mirror 211 and the photoconductive layer 209. As the light-shielding layer 210, it is possible to use a carbon-dispersed type organic thin film, CdTe and $Al_2O_3$ on which Ag is electroless-plated.

On the glass substrate 212 opposed to the first substrate 203, the data-transmitting electrode 213 is provided. For forming the electrode 213, the transparent ITO evaporated on the glass substrate 212 by means of the sputtering technique is patterned as stripes.

On the dielectric mirror 211 and the data-transmitting electrode 213, there are respectively formed the orientation films 214a and 214b by spin-coating the polyimide and sintering the coated film. Then, the molecular orientation is carried out on the surface of the orientation films 214a and 214b.

Then, the first substrate 203 and the glass substrate 212 are pasted to each other through a spacer(s) (not shown) in a manner that the data-transmitting electrode 213 may be crossed with the scanning light waveguide 201 at right angles. Liquid crystal is injected into the space between both of the substrates and is sealed for forming the liquid crystal layer 215.

Finally, the first substrate 203 on which the light waveguide 201 is formed is properly positioned with respect to the second substrate 204 on which the light waveguide 202 is formed. And, both of the substrates 203 and 204 are pasted to each other with the coupling agent 207. As mentioned above, the first substrate 203 is made of a fiber plate and the second substrate 204 is made of quartz.

The liquid crystal used for forming the liquid crystal layer 215 has a larger impedance than the part of the photoconductive layer 209 selected as a scanning line by irradiated light and a smaller impedance than the part of the photoconductive layer 209 not selected as the scanning line.

The liquid crystal of the layer 215 has a far larger impedance than the part of the photoconductive layer 209 selected as the scanning line. Therefore, the almost of a data signal applied between the electrodes is applied to the liquid crystal layer 215. Since, however, the liquid crystal layer 215 has a larger impedance than the part of the photoconductive layer 209 not selected as the scanning line, no data signal is applied onto the liquid crystal layer 215.

Like the liquid crystal light valve according to the first embodiment, the light valve according to the sixth embodiment enables to offer a high-contrast image and reduce the overall device in size.

In the known liquid crystal light valve, the light waveguide is formed on one substrate. Hence, a gap exists between the adjacent scanning lines. According to this embodiment, however, the light waveguides are formed on the two substrates so that such a gap between the adjacent scanning lines may disappears. This results in increasing the scanning lines in number, thereby improving a resolution and a numerical aperture of the liquid crystal light valve.

In a case that the first substrate 203 is made of glass, the light signal leaked out of the light waveguide 202 is expanded while the light passes through the first substrate 203. This results in reducing the quantity of light on the scanning lines. Further, if the light signal is leaked onto the adjacent scanning line, a crosstalk may take place. To prevent these disadvantages, in the liquid crystal light valve of the sixth embodiment, the first substrate 203 is made of a fiber plate. The use of the fiber plate makes it possible to transmit the light signal derived from the light waveguide 202 in the vertically upward direction (in the direction opposite to the traveling direction of the reading light shown in FIG. 11) without spreading the light signal in the horizontal direction.

Figure 12:
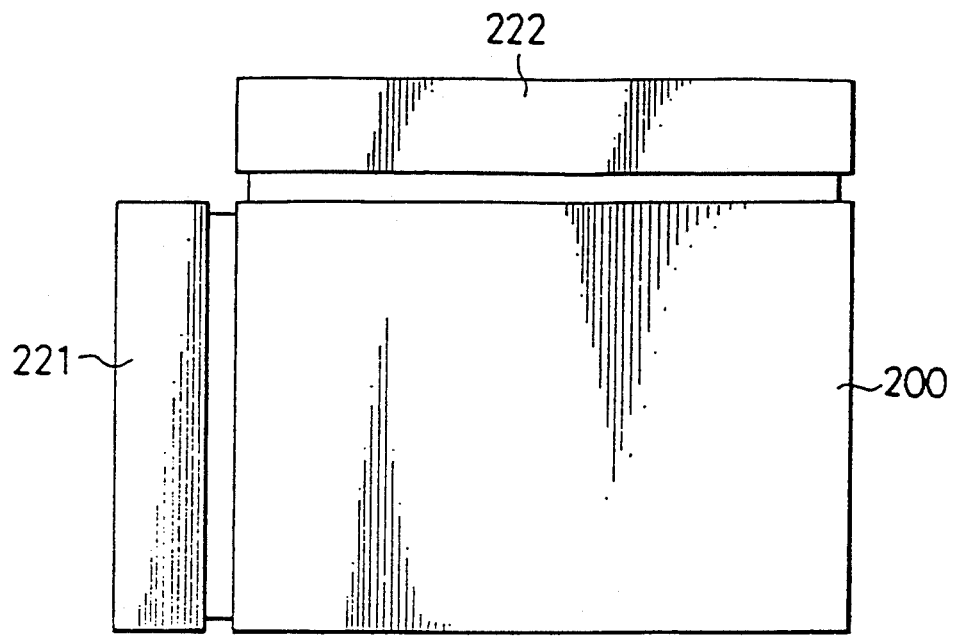
FIG. 12 is a schematic view showing a driving unit included in the liquid crystal light valve shown in FIG. 11.

FIG. 12 schematically showing a driving unit of the liquid crystal light valve 200 shown in FIG. 11.

As shown, the driving unit provides an LED array 221 for a scanning signal and a driving circuit 222 for driving the data-transmitting electrode 213. In place of the LED array 221, a semiconductor laser array can be used.

The LED array 221 is connected to the liquid crystal light valve 200 so that a light pulse signal may be guided from the LED array 221 to the liquid crystal light valve 200.

Figure 13:
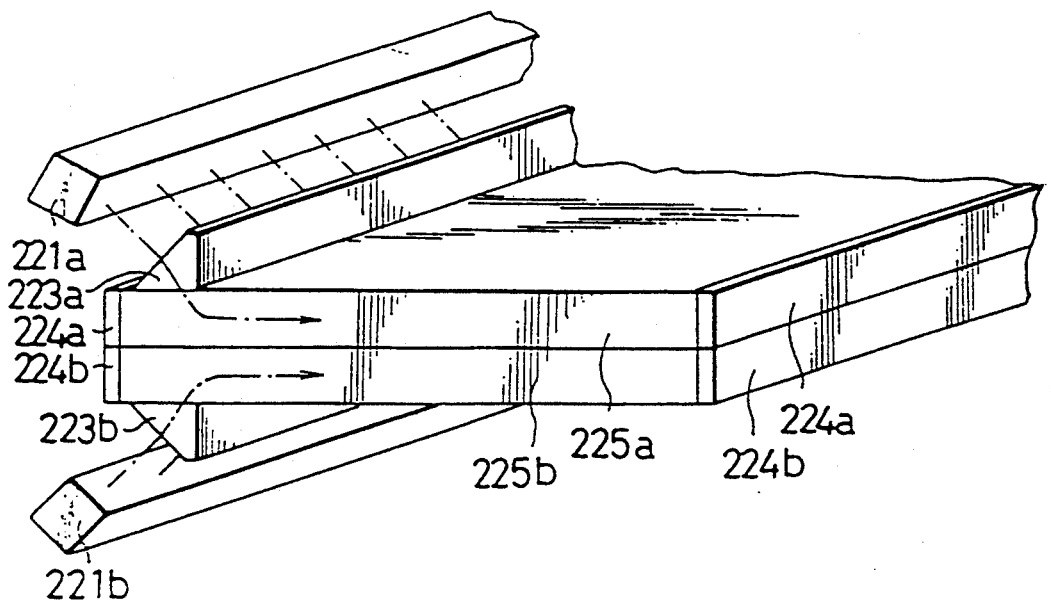
FIG. 13 is a perspective view showing a connection of an LED array shown in FIG. 12 in detail.

FIG. 13 is a perspective view showing a connection of the LED array 221 shown in FIG. 12 in detail.

As shown, the LED array 221 shown in FIG. 12 is composed of the LED arrays 221a and 221b. The lights emitted from the LED arrays 221a and 221b are guided to the light waveguides 225a and 225b through the optical prisms 223a and 223b, respectively. The light waveguides 225a and 225b correspond to the light waveguides 201 and 202 of the liquid crystal light valve shown in FIG. 11, respectively.

That is, each pair of the LED array and the optical prism is provided for the upper and the lower scanning light waveguides, respectively. For simplifying the description, in FIG. 13, there are illustrated only the upper and the lower light waveguides 225a and 225b, that is, the other components of the light valve are not illustrative.

Without using the optical prisms 223a and 223b, each end of the light waveguides 225a and 225b is directly connected with each luminous plane of the LED arrays 221a and 221b.

224a and 224b denote reflective mirrors, which serve to reflect the light on the ends of the light waveguides 225a and 225b for efficiently guiding the light into the photoconductive layer of the liquid crystal light valve 200. These mirrors are made of Al or Ag.

The construction of the projective type image display device using the liquid crystal light valve 200 and the operation mode of the liquid crystal layer are the same as those of the projection type display device shown in FIG. 4.

In turn, the description will be directed to a liquid crystal light valve according to a seventh embodiment of the invention.

Figure 14:
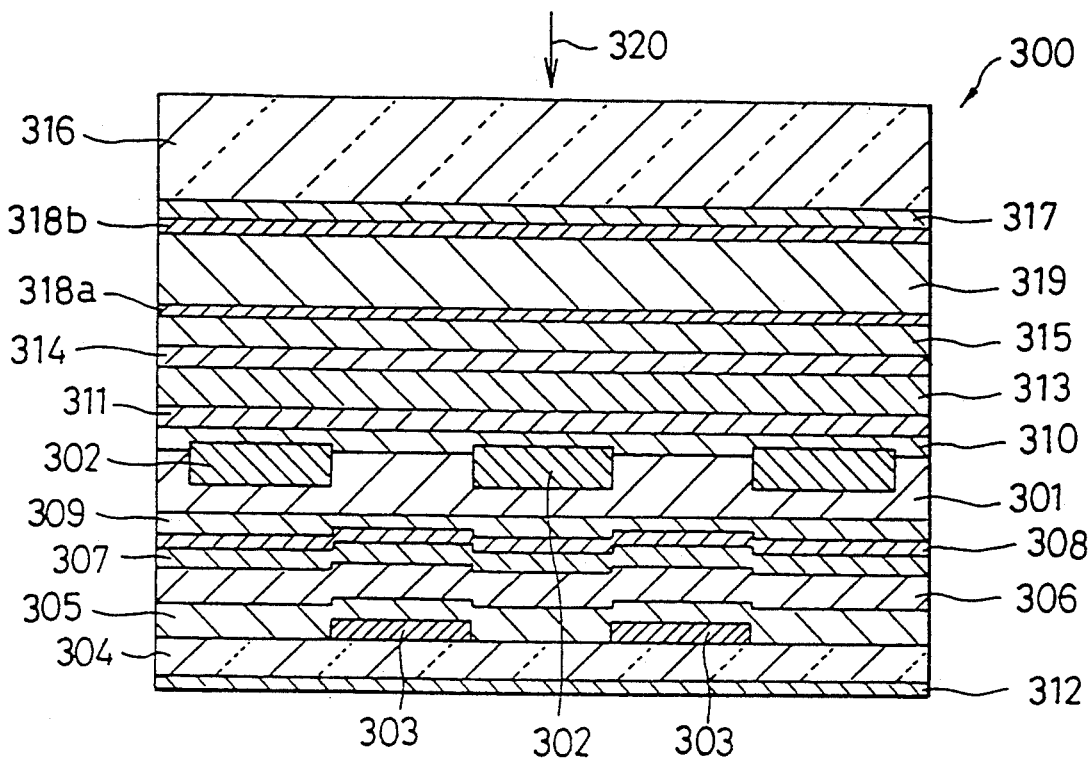
FIG. 14 is a sectional view schematically showing a liquid crystal light valve according to a seventh embodiment of the present invention.

FIG. 14 is a sectional view schematically showing the liquid crystal light valve of the seventh embodiment.

In this liquid crystal light valve, a phosphor layer made of an EL element is used in place of the lower light waveguide 202, served as a scanning light signal source, included in the liquid crystal light valve 200 shown in FIG. 11.

As shown in FIG. 14, the liquid crystal light valve 300 is arranged to have a fiber plate 301, a light waveguide 302, a background electrode 303, a glass substrate 304, a lower insulating 305, a phosphor layer made of an EL element, an upper insulating layer 307, a transparent electrode 308, a coupling resin 309, a clad layer 310, a transparent electrode 311, a metal film 312, a photoconductive layer 313, a light-shielding layer 314, a dielectric mirror 315, a glass substrate 316, a data-transmitting electrode 317, orientation films 318a and 318b, and a liquid crystal layer 319.

The description will be directed to the method of manufacturing the liquid crystal light valve 300.

The liquid crystal light valve 300 is formed to have a sandwiched structure where the phosphor layer 306 is laid between the upper and the lower insulating layers 305 and 307 so that the EL element may stably output the light.

At first, the rear electrode 303 is formed on the glass substrate 304. The forming process takes the steps of depositing an Al film with the EB evaporation technique, etching the Al film, and patterning the etched film as stripes. In place of Al, Ti or Mo may be used.

Then, between the rear electrode 303 and the transparent electrode 308, there are required insulating layers for applying a stable high electric filed onto the phosphor layer 306. Concretely, the lower insulating layer 305 is formed on the side of the rear electrode 303 and the upper insulating layer 307 is formed on the side of the transparent electrode 308.

The lower insulating layer 305 employs a laminating structure consisting of one layer of $Al_2O_3$ and the other layer of $SiN_x$ alternately laminated. The layer of $Al_2O_3$ is formed in an Ar atmosphere having an $Al_2O_3$ target and the layer of $SiN_x$ is formed in an mixed gas of Ar and $N_2$ having an Si target by means of the RF sputtering technique.

Next, on the lower insulating layer 305, the phosphor layer made of an EL element is laminated. The phosphor layer 306 is formed of a thin-film type phosphor layer and a powder-type phosphor layer having a fluorescent material dispersed in dielectric. Then, on the phosphor layer 306, the upper insulating layer 307 is formed.

The upper insulating layer 307 is formed to have a laminating structure consisting of one layer of $SiO_x$ and the other layer of $SiN_x$ alternately laminated. The layer of $SiO_x$ is formed in a mixed gas of Ar and $O_2$ having an Si target and the layer of $SiN_x$ is formed in a mixed gas of Ar and $N_2$ having an Si target by means of the RF sputtering technique.

In place of $SiO_x$ and $SiN_x$, the material used for forming the upper insulating layer 307 may be $BaTa_2O_6$, $SrTiO_6$ or $Ta_2O_5$.

Next, with the RF sputtering technique, the transparent electrode 308 is formed on the upper insulating layer 307. The material of the electrode 308 is ITO.

The above-described arrangement has such an advantage as allowing the light valve to be driven completely independently of the luminous layer 306 served as a scanning light signal source if the transparent electrode 308 is connected to the ground.

The phosphor layer 306 made of the EL element is driven by a bipolar pulse, that is, by alternate current. If a current-limiting layer may be provided between the phosphor layer 306 and the background electrode 303, the phosphor layer 306 is allowed to be driven by a single-polarity pulse, that is, by direct current. The current-limiting layer is a thick film formed of a binder resin having $MnO_2$ dispersed therein. The thickness of the layer is as wide as 1 $\mu$m to 10 $\mu$m.

Next, the description will be directed to a method for manufacturing the light waveguide 302.

For forming the light waveguide 302, grooves for the light waveguide are formed on the fiber plate 301 by means of the wet-etching technique. That is, resist is coated on both of the surfaces of the fiber plate 301. The coated resist is pre-sintered, exposed, developed, and host-sintered for forming a mask on one of the surfaces. Next, the etching is performed on the mask by using buffered hydrofluoric acid and the resist is stripped off the surface, resulting in completing striped grooves on the surface.

In place of the wet-etching technique, for forming the grooves, it is possible to use a dry-etching technique such as sputter-etching based on an Ar gas or argon ion beam etching or a mechanical abrading technique.

The light waveguide 302 uses as its material a high molecular material, which is easily worked by a photolithograph technique or a molding technique. Concretely, a highly heat-resistive polyimide is the most approximate, because it is necessary to heat the substrate temperature up to 300° C. when the photoconductive layer 313 is formed by the plasma CVD technique.

The polyimide solved with a solvent is coated on the grooves-formed surface of the first substrate 301 with a spinner. The resulting surface is then subject to heat treatment. Resist is coated on the heat-treated surface. The resist-coated surface is pre-sintered, exposed, developed, and host-sintered for forming a mask in a manner to cover the grooves formed on the first substrate 301. Then, the coated polyimide is etched and the resist is stripped off the surface. The final heat treatment is carried out on the resulting surface for completing the light waveguide 302.

As a technique for etching the polyimide, the wet-etching method is carried out by using a hydrazine and hydrato system etchant.

In this embodiment, the used polyimide is non-sensitive. However, the use of sensitive polyimide makes it possible to reduce the steps of the manufacturing process of the light waveguide.

The transparent electrode 311 made of ITO, formed on the light waveguide 301, has a larger index of refraction than the light waveguide 302, so that the clad layer 310 needs to be formed. By means of a biased sputtering technique, the clad layer 310 is formed of SiO2, that is, a dielectric material having a low index of refraction.

As another method for forming the clad layer 310, the polyimide for forming the clad layer 310 has a smaller index of refraction than the polyimide used for forming the light waveguide 302. In this case, it is necessary to form the clad layer 310 so that the moderate quantity of light is allowed to be leaked out of the light waveguide 302. The proper thickness of the clad layer is in the range of 50 angstrom. In this embodiment, the thickness of the clad layer 310 is about 3000 angstrom.

The light waveguide 302 has the same width as the rear electrode 303. The pitch between the adjacent light waveguides 302 is twice as wide as the width of the light waveguide 302. Like the light waveguide 202, the pitch between the adjacent rear electrodes 303 is twice as wide as the width of the rear electrode 303. The light waveguide 302 is located in parallel to the rear electrode 303 so that the light waveguides 302 are shifted from the corresponding rear electrodes 303 by ½ pitch, respectively.

On the back surface of the second substrate 304, that is, on the surface opposite to the surface on which the rear electrode 303 is formed, the metal film 312 is formed for cutting off the light applied from any place except the light waveguide.

The metal film 312 can be formed of Ag, Al or Mo. In place of the metal film 312, it is possible to use a pigment-dispersed type light-shielding film, which is mainly used for a color filter of the liquid crystal panel.

Next, the description will be directed to a method for forming the layers located above the clad layer 310.

On the clad layer 310, the transparent electrode 311 made of ITO is deposited by the sputtering technique. On the transparent electrode 311, the material of a-Si:H is used as the photoconductive layer 313 where light is received from the light waveguide 302 and the EL element by means of the plasma CVD technique.

As the photoconductive layer 313 whose impedance changes according to the irradiated light, it is possible to use $Bi_{12}SiO_{20}$, CdS, a-SiC:H, a-SiO:H, or a-SiN:H.

Next, the light-shielding layer 314 is formed on the photoconductive layer 313. Then, the dielectric mirror 315 is formed by means of the EB evaporation technique. The dielectric mirror 315 is made of a multilayered film consisting of one layer of TiO2 and the other layer of SiO2 alternately laminated.

In order to prevent reading light 320 from being leaked to the photoconductive layer 313 through the dielectric mirror 315, it is necessary to provide the light-shielding layer 314 between the dielectric mirror 315 and the photoconductive layer 313. As the light-shielding layer 314, it is possible to use a carbon-dispersed type organic thin film, CdTe and $Al_2O_3$ on which Ag is electroless-plated.

On the glass substrate 316 opposed to the fiber plate 301, the data-transmitting electrode 317 is provided. For forming the electrode 317, the transparent ITO evaporated on the glass substrate 316 by means of the sputtering technique is patterned as stripes.

On the dielectric mirror 315 and the data-transmitting electrode 317, there are respectively formed the orientation films 318a and 318b by spin-coating the polyimide and sintering the coated film. Then, the molecular orientation is carried out on the surface of the orientation films 318a and 318b.

After forming the orientation films 318a and 318b, the fiber plate 301 and the glass substrate 316 are pasted to each other through a spacer(s) (not shown) in a manner that the data-transmitting electrode 317 may be crossed with the light waveguide 302 at right angles. Liquid crystal is injected into the space between both of the substrates and is sealed for forming the liquid crystal layer 319.

Finally, the fiber plate 301 on which the light waveguide 302 is formed is properly positioned with respect to the glass substrate 304 on which the phosphor layer 306 is formed. And, both 301 and 304 are pasted to each other with the coupling agent 309.

The liquid crystal used for forming the liquid crystal layer 319 has a larger impedance than the part of the photoconductive layer 313 selected as a scanning line by irradiated light and a smaller impedance than the part of the photoconductive layer 313 not selected as the scanning line. Hence, the almost of a data signal applied between the electrodes is applied to the liquid crystal layer 319. Since, however, the part of the photoconductive layer 313 not selected as the scanning line has a larger impedance than the liquid crystal layer 319, no data signal is applied onto the liquid crystal layer 319.

Like the liquid crystal light valve according to the first embodiment, the light valve according to the embodiment enables to offer a high-contrast image and reduce the overall device in size.

In the known liquid crystal light valve, the light waveguide is formed on one substrate. Hence, a gap exists between the adjacent scanning lines. According to this embodiment, however, the light waveguides are formed on the two substrates so that such a gap between the adjacent scanning lines may disappears. This results in increasing the scanning lines in number, thereby improving a resolution and a numerical aperture of the light valve.

In a case that the glass substrate is used in place of the fiber plate 301, the light signal leaked out of the phosphor layer 306 is expanded while the light passes through the glass substrate. This results in reducing the quantity of light on the scanning lines. Further, if the light signal is leaked onto the adjacent scanning line, a crosstalk may take place. To prevent these disadvantages, in the liquid crystal light valve of the seventh embodiment, the substrate is made of the fiber plate 301. The use of the fiber plate makes it possible to transmit the light signal derived from the phosphor layer 306 in the vertically upward direction (in the direction opposite to the traveling direction of the reading light shown in FIG. 14) without spreading the light signal in the horizontal direction.

In the light valve according to the seventh embodiment, the lower light waveguide served as a scanning light signal source uses phosphor layer 306 made of an EL element. Likewise, the upper light waveguide served as a scanning light signal source may use the phosphor layer made of an EL element. Or, both of the upper and the lower valve waveguides may use the phosphor layers each made of an EL element. In any case, the light valve enables to operate properly.

In this embodiment, the striped collision-excitement type EL element is used as a scanning line. In place, an injection type EL element may be used. As an example of the injection type EL element, it is possible to use a pin element have a phosphor layer made of a-SiC:H.

The construction of a projection type display device using the liquid crystal light valve 300 and the operation mode of the liquid crystal layer included in the light valve 300 are the same as those of the projective type image display device shown in FIG. 4 and its relevant liquid crystal layer. Hence, the liquid crystal light valve 300 enables to apply to a high-contrast and high-resolution projection type display device.

Figure 15:
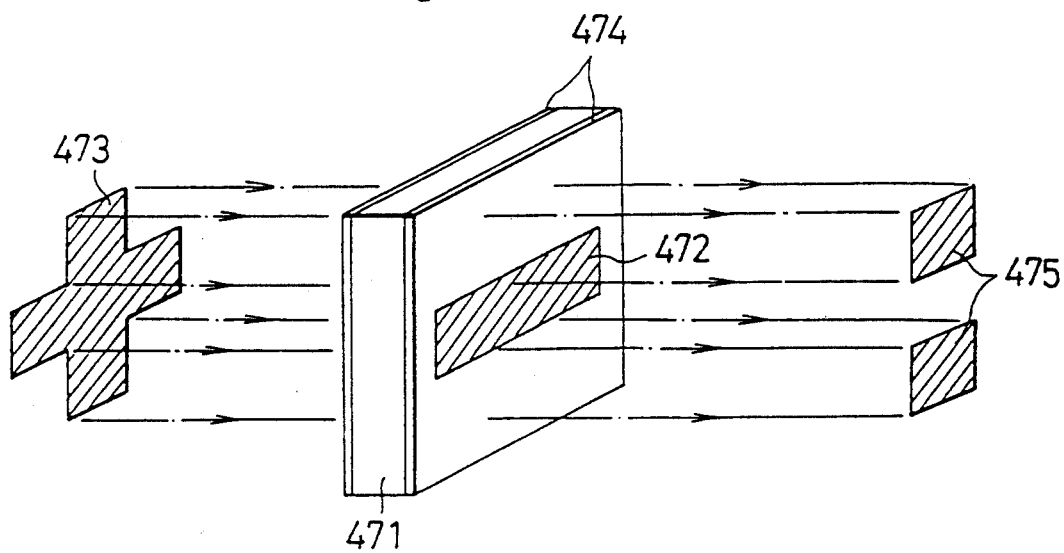
FIG. 15 is a schematic view showing a two-dimensional light-operating element to which applied is a liquid crystal light valve according to an eighth embodiment of the present invention.

In turn, the description will be directed to a liquid crystal light valve according to an eighth embodiment of the present invention as referring to FIG. 15. The light valve of the eighth embodiment is arranged so that the light valve according to from the first to the seventh embodiment may apply to a two-dimensional operating element.

FIG. 15 is a schematic view showing a light-operating method if the liquid crystal light valve according to the eighth embodiment applies to the two-dimensional light-operating element.

As shown, the liquid crystal light valve 471 is arranged to have the same components as from the light valve 10 to 300 according to from the first to the seventh embodiment (see FIGS. 1, 5, 7, 9, 11 and 14), excepting the metal film 15, 45, 85, 115, 208 and 312. 474 denotes a polarizing plate which is provided on either surface of the light valve 471 in a cross-nicol manner.

The liquid crystal light valve 471 uses as its liquid crystal layer ferroelectric liquid crystal having a storage function. In place, as storage type liquid crystal, guest-host type or phase-change type liquid crystal may be used.

Like the liquid crystal light valve 10, 40, 80, 100, 200 and 300 according to from the first to the seventh embodiment, the liquid crystal light valve 474 enables to offer a high-contrast image.

Next, the description will be directed to a light-operating method if the liquid crystal light valve 471 is used as the two-dimensional light-operating element.

At first, a piece of two-dimensional data is written onto the light valve 471 with an LED scanning signal and a data signal.

FIG. 15 shows a state where the image data "−" 472 is written in the light valve 471. That is, since the liquid crystal layer of the light valve 471 provides a storage type liquid crystal as mentioned above, the written image data "−" 72 is stored in the liquid crystal layer.

Next, when another kind of image data "+" 473 is applied from one side (viewed in the left-hand of FIG. 15) into the light valve 471 with an infrared ray of light, the infrared ray of light standing for the data "+" 473 is allowed to transmit through the photoconductive layer in the light valve 471, because the photoconductive layer made of a-Si:H has a property that it may transmit an infrared ray of light therethrough. The transmitted ray of light is cut off by the polarizing plate 474 on the part of the liquid crystal where the data "−" 472 is stored. Hence, the transmitted ray of light 475 is selected so that the data "−" 472 is excluded from the data "+" 473. This results in making it for the liquid crystal light valve 471 of the eighth embodiment to apply to two-dimensional light-operation of image checking.

Many widely different embodiments of the present invention may be constructed without departing from the spirit and scope of the present invention. It should be understood that the present invention is not limited to the specific embodiments described in the specification, except as defined in the appended claims.

What is claimed is:

1. A liquid crystal light valve for forming an image according to data signals applied exterior thereof, comprising
   a first substrate having a first transparent electrode formed thereon;
   a second substrate having a plurality of second transparent electrodes formed thereon in a striped manner and extending along one direction, said data signals being applied to said second electrodes;
   a liquid crystal provided between said first and second substrates;
   a photoconductive layer formed between said liquid crystal layer and said first substrate, said photoconductive layer being adapted to change impedance thereof in response to an incident ray of light thereto; and
   a plurality of light waveguides disposed in a first substrate side with respect to said liquid crystal for emitting scanning light signals to said photoconductive layer, said light waveguides being formed in a striped manner and extending along another direction intersecting said one direction.

2. A liquid crystal light valve as claimed in claim 1, wherein said plurality of light waveguides are formed on said first substrate, and said first transparent electrode is patterned in a form of a striped manner.

3. A liquid crystal light valve as claimed in claim 2, wherein said first transparent electrode is parallel to said light waveguides.

4. A liquid crystal light valve as claimed in claim 1, wherein each of said light waveguides is made of a high-molecular light waveguide, and said photoconductive layer is located between said first substrate and said plurality of light waveguides.

5. A liquid crystal light valve as claimed in claim 1, wherein each of said light waveguides is made of an electro-luminescent element including a phosphor layer, and two insulating layers sandwiching said phosphor layer and a rear electrode.

6. A liquid crystal light valve as claimed in claim 1, wherein said light valve further comprises a third substrate disposed on said first substrate at an opposite side with respect to said first transparent electrode, said light waveguides divided into two groups respectively formed on said first and third substrates.

7. A liquid crystal light valve as claimed in claim 6, wherein said first substrate is made of a fiber plate.

8. A liquid crystal light valve as claimed in claim 6, wherein light waveguides of at least one group are made of electro-luminescent elements respectively.

9. A liquid crystal light valve as claimed in claim 1, further comprising a driving means for driving said light valve, including a driving circuit for driving said second transparent electrodes.

10. A liquid crystal light valve as claimed in claim 9, wherein said driving means includes a Light-Emitting Diode array disposed at one end of said light waveguides to introduce the scanning light signal into said light waveguides.

11. A liquid crystal light valve claimed in claim 9, wherein said driving means includes a semiconductor laser disposed at one end of said light waveguides to introduce the scanning light signal into said light waveguides.

12. A liquid crystal light valve as claimed in claim 9, wherein said waveguides include an electro-luminescent element, and said driving means includes a driver array for driving said electro-luminescent element.

13. A liquid crystal light valve as claimed in claim 3, wherein said first electrode is located parallel to and shifted by $\frac{1}{2}$ pitch from a stripes of said plurality of light waveguides.

14. A liquid crystal light valve as claimed in claim 7, wherein light waveguides on said first substrate and light waveguides on said third substrate are arranged respectively in a pitch that is twice as wide as a width of one light waveguide, and light waveguides on said first substrate and light waveguides on said third substrate are shifted with respect to each other by a half pitch.

15. A liquid crystal light valve as claimed in claim 14, wherein indexes of refraction of said first substrate, said third substrate, and said light waveguides are equal to one another, and an index of said first substrate is same or larger than an index of said light waveguides of said third substrate.

* * * * *